United States Patent
De Sapio et al.

(10) Patent No.: US 9,364,951 B1
(45) Date of Patent: Jun. 14, 2016

(54) SYSTEM FOR CONTROLLING MOTION AND CONSTRAINT FORCES IN A ROBOTIC SYSTEM

(71) Applicant: HRL Laboratories, LLC, Malibu, CA (US)

(72) Inventors: Vincent De Sapio, Westlake Village, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 66 days.

(21) Appl. No.: 14/513,583

(22) Filed: Oct. 14, 2014

Related U.S. Application Data

(60) Provisional application No. 61/890,678, filed on Oct. 14, 2013.

(51) Int. Cl.
  *B25J 9/16* (2006.01)
  *G05B 19/19* (2006.01)
  *B25J 9/00* (2006.01)

(52) U.S. Cl.
  CPC .................. *B25J 9/16* (2013.01); *B25J 9/0006* (2013.01); *B25J 9/1633* (2013.01); *G05B 19/19* (2013.01); *G05B 2219/34351* (2013.01); *G05B 2219/36432* (2013.01); *G05B 2219/40359* (2013.01)

(58) Field of Classification Search
  CPC ........... G05B 2219/40359; G05B 2219/23227; G05B 2219/34351; G05B 2219/36432; G05B 19/19; B25J 9/16; B25J 9/1633; B25J 9/0006
  USPC ........................................................ 700/261
  See application file for complete search history.

(56) References Cited

U.S. PATENT DOCUMENTS

| | | | | |
|---|---|---|---|---|
| 5,150,026 A | * | 9/1992 | Seraji | B25J 9/1643 318/567 |
| 8,335,591 B2 | * | 12/2012 | Takahashi | B25J 9/1633 414/5 |
| 8,874,262 B2 | * | 10/2014 | Mistry | G05B 19/00 294/106 |
| 9,120,227 B2 | * | 9/2015 | Zheng | B25J 9/1633 |
| 9,221,172 B2 | * | 12/2015 | Williamson | B25J 9/1643 |
| 2004/0254679 A1 | * | 12/2004 | Nagasaka | B62D 57/032 700/245 |

(Continued)

OTHER PUBLICATIONS

Huston R. L., Liu, C. Q., and Li, F., "Equivalent control of constrained multibody systems," Multibody System Dynamics, 10(3), pp. 313-321 (2003).

(Continued)

*Primary Examiner* — Jason Holloway
(74) *Attorney, Agent, or Firm* — Tope-McKay & Associates

(57) ABSTRACT

Described is a system for controlling motion and constraint forces in a robotic system, the system infers constraints, at each time step, from a sensed state of robot/environment interactions. The inferred constraints are appended to known internal robot constraints to generate constrained dynamics. Properties associated with the constrained dynamics are determined provided to a controller. Inequality conditions associated with maintaining desired robot/environment interactions are also determined. A set of equality conditions based on the inequality conditions are then specified. The set of equality conditions are aggregated with any internal robot constraints to generate aggregated conditions that are provided to the controller. Joint torque commands are then generated for the robot based on the aggregated conditions and a specified task and null space motion command. Finally, the robot is actuated based on the joint torque commands.

4 Claims, 9 Drawing Sheets

(56) References Cited

U.S. PATENT DOCUMENTS

| | | | | |
|---|---|---|---|---|
| 2007/0106423 | A1* | 5/2007 | Myeong | G05D 1/027 700/245 |
| 2007/0185618 | A1* | 8/2007 | Nagasaka | B62D 57/032 700/245 |
| 2009/0105997 | A1* | 4/2009 | Nagasaka | G06F 17/5009 703/2 |
| 2010/0204828 | A1* | 8/2010 | Yoshizawa | B25J 9/1666 700/245 |
| 2010/0250001 | A1* | 9/2010 | Hodgins | B62D 57/032 700/261 |
| 2011/0172818 | A1* | 7/2011 | Kim | B25J 9/1666 700/246 |
| 2013/0079930 | A1* | 3/2013 | Mistry | G05B 19/00 700/261 |
| 2014/0081461 | A1* | 3/2014 | Williamson | B25J 9/1643 700/261 |
| 2015/0298318 | A1* | 10/2015 | Wang | B25J 9/1676 700/257 |

OTHER PUBLICATIONS

Khatib, O., Yokoi, K., Chang, K., Ruspini, D. Holmberg, R., Casal, A., and Baader, A., "Force strategies for cooperative tasks in multiple mobile manipulation systems", Robotics Research (pp. 333-342) (1996), Springer London.

Chang, K. S., Holmberg, R., and Khatib, O., "The augmented object model: Cooperative manipulation and parallel mechanism dynamics," IRobotics and Automation, 2000, Proceedings, ICRA'00. IEEE International Conference (vol. 1, pp. 470-475).

Khatib, O., Sentis, L., Park, J., and Warren, J., "Whole-body dynamic behavior and control of human-like robots," International Journal of Humanoid Robotics, 1(01), pp. 29-43 (2004).

Sentis, L., Park, J., and Khatib, O., "Modeling and control of multi-contact centers of pressure and internal forces in humanoid robots," Intelligent Robots and Systems, Oct. 2009, IROS 2009, IEEE/RSJ International Conference (pp. 453-460).

De Sapio, V., Khatib, O., and Delp, S., "Task-level approaches for the control of constrained multibody systems," Multibody System Dynamics, 16(1), pp. 73-102 (2006).

Khatib, O., "A unified approach for motion and force control of robot manipulators: The operational space formulation," Robotics and Automation, IEEE Journal of, 3(1), pp. 43-53 (1987).

De Sapio, V., and Park, J., "Multitask constrained motion control using a mass-weighted orthogonal decomposition," Journal of Applied Mechanics, 77(4), 041004 (2010) (10 pages).

De Sapio, V., "Task-level control of motion and constraint forces in holonomically constrained robotic systems," In Proceedings of the 18th World Congress of the International Federation of Automatic Control (2011).

Khatib, O., "Inertial properties in robotic manipulation: An object-level framework," The International Journal of Robotics Research, 14(1), pp. 19-36, (1995).

* cited by examiner

SYSTEM FOR CONTROLLING MOTION AND CONSTRAINT FORCES IN A ROBOTIC SYSTEM

GOVERNMENT RIGHTS

This invention was made with government support under U.S. Government Contract Number HR 0011-09-C-0001. The government has certain rights in the invention.

CROSS-REFERENCE TO RELATED APPLICATIONS

This is a non-provisional patent application of U.S. Provisional Application No. 61/890,678, filed Oct. 14, 2013, entitled, "A system for controlling motion and constraint forces in a robotic system without the need for force sensing."

BACKGROUND OF THE INVENTION (1) Field of Invention

The present invention relates to a robotic control system and, more particularly, to a system for controlling motion and constraint forces in a robotic system without the need for force sensing.

(2) Description of Related Art

Robotic control in complex environments increasingly demands high degree-of-freedom robots that can perform task-level motion commands in the presence of multiple interactions with the physical environment. These interactions with the environment may be intermittent (e.g., robot legs making contact with the floor, robot arms interacting with objects or other robots, etc.) or persistent internal constraints associated with the structure of the robot (e.g., parallel kinematic structures involving loop closures in the robot's kinematic chains).

Traditional joint space control is ill suited to address constraints since the constraints restrict robot motion to a subset of joint space. Joint space control assumes the entire joint space is accessible, consequently, a given joint space command will likely violate the system constraints.

Several research efforts have dealt with constraints in robotic control. for example, Huston, R. L., Liu, C. Q., and Li, F., in "Equivalent control of constrained multibody systems," Multibody System Dynamics, 10(3), 313-321 (2003), addressed constraints in the context of equivalent motion control; that is, determining generalized force systems that, although different, will have the same dynamic effect. The approach of Huston, Liu, and Li, while providing insight into how certain generalized forces can be nullified by system constraints, is rooted in a joint space analysis and is not well suited to a unified constrained task-level control framework.

Coordinated multi-arm movements was described by Khatib, O., Yokoi, K., Chang, K., Ruspini, D., Holmberg, R., Casal, A., and Baader, A. (1996), in "Force strategies for cooperative tasks in multiple mobile manipulation systems", Robotics Research (pp. 333-342) (1996), Springer London. Khatib et al. demonstrated the augmented object and virtual linkage model, while Chang, K. S., Holmberg, R., and Khatib, O., in "The augmented object model: Cooperative manipulation and parallel mechanism dynamics," IRobotics and Automation, 2000, Proceedings, ICRA '00. IEEE International Conference (Vol. 1, pp. 470-475), IEEE, demonstrated a process for manipulating objects with multiple arms and controlling internal forces in the system. The work of Chang et al. is based on the operational space approach, a task-level control formalism; however it does not offer the flexibility of dealing with general holonomic constraints, or passive joints (many closed chain robotic structures consist of unactuated, or passive joints). The whole body control framework of Khatib, O., Sentis, L., Park, J., and Warren, J., in "Whole-body dynamic behavior and control of human-like robots," International Journal of Humanoid Robotics, 1(01), 29-43 (2004) and Sentis, L., Park, J., and Khatib, O. in "Modeling and control of multi-contact centers of pressure and internal forces in humanoid robots," Intelligent Robots and Systems, October 2009, IROS 2009, IEE/RSJ International Conference (pp. 453-460) IEEE, is also based on the operational space approach, but also suffers in that their work does not offer the desired flexibility.

As evident above, the state of the art is directed to using operational space or joint space control with force servoing when dealing with constraints imposed by environmental interactions; or to using ad hoc inverse kinematic solutions and joint servoing when dealing with internal mechanism constraints such as in a parallel mechanism. While operable to some extent, the prior art is limited in that it does not provide for constrained task-level motion and force control to provide the desired flexibility.

Thus, a continuing need exists for a system for controlling motion and constraint forces in a robotic system that results in a unified and flexible technique for motion and force control.

SUMMARY OF INVENTION

Described is a system for controlling motion and constraint forces in a robotic system, such as at least one torque controlled robot having constraints and one or more joints. The system infers constraints, at each time step, from a sensed state of robot/environment interactions. The inferred constraints are appended to known internal robot constraints to generate constrained dynamics. Properties associated with the constrained dynamics are determined provided to a controller. Inequality conditions associated with maintaining desired robot/environment interactions are also determined. A set of equality conditions based on the inequality conditions are then specified. The set of equality conditions are aggregated with any internal robot constraints to generate aggregated conditions that are provided to the controller. Joint torque commands are then generated for the robot based on the aggregated conditions and a specified task and null space motion command. Finally, the robot is actuated based on the joint torque commands.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
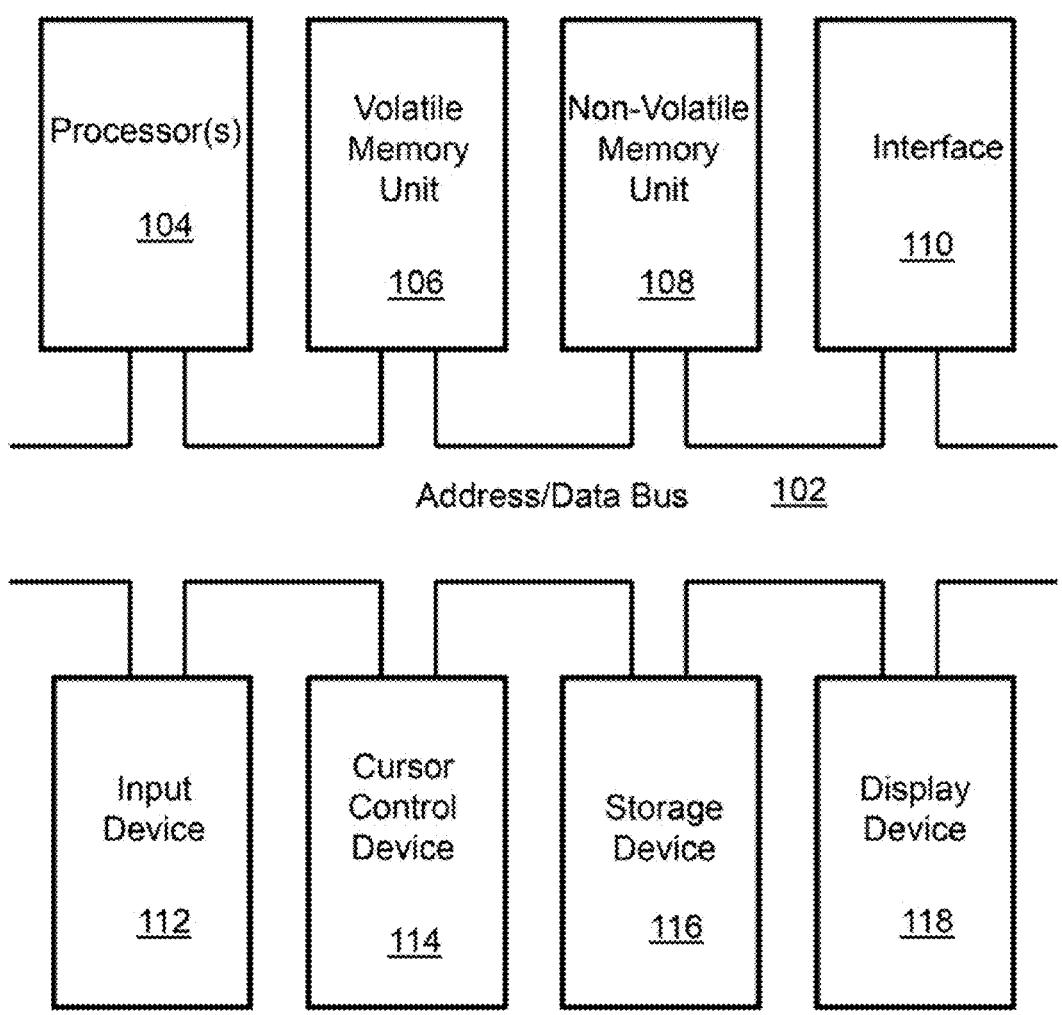
FIG. 1 is a block diagram depicting the components of system according to the principles of the present invention.

The present invention relates to a robotic control system and, more particularly, to a system for controlling motion and constraint forces in a robotic system without the need for force sensing. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention. Finally, specific details of the present invention are provided to give an understanding of the specific aspects.

(1) Principal Aspects

The present invention has three "principal" aspects. The first is a system for controlling motion and constraint forces in a robotic system. The system is typically in the form of a computer system operating software or in the form of a "hard-coded" instruction set. This system may be incorporated into a wide variety of devices that provide different functionalities. In one aspect, the system is incorporated into a robot having actuators and appendages or other motion operable components and any other components as may be required to provide the functionality as described herein. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
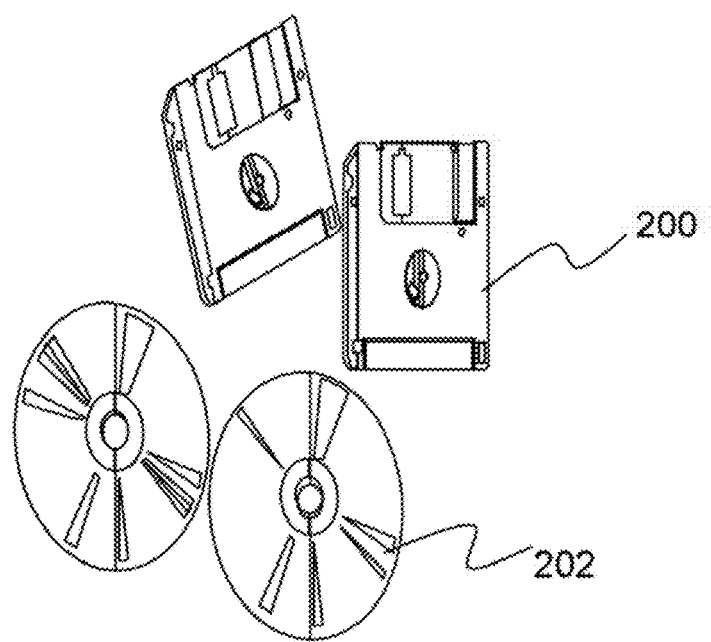
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

Figure 3:
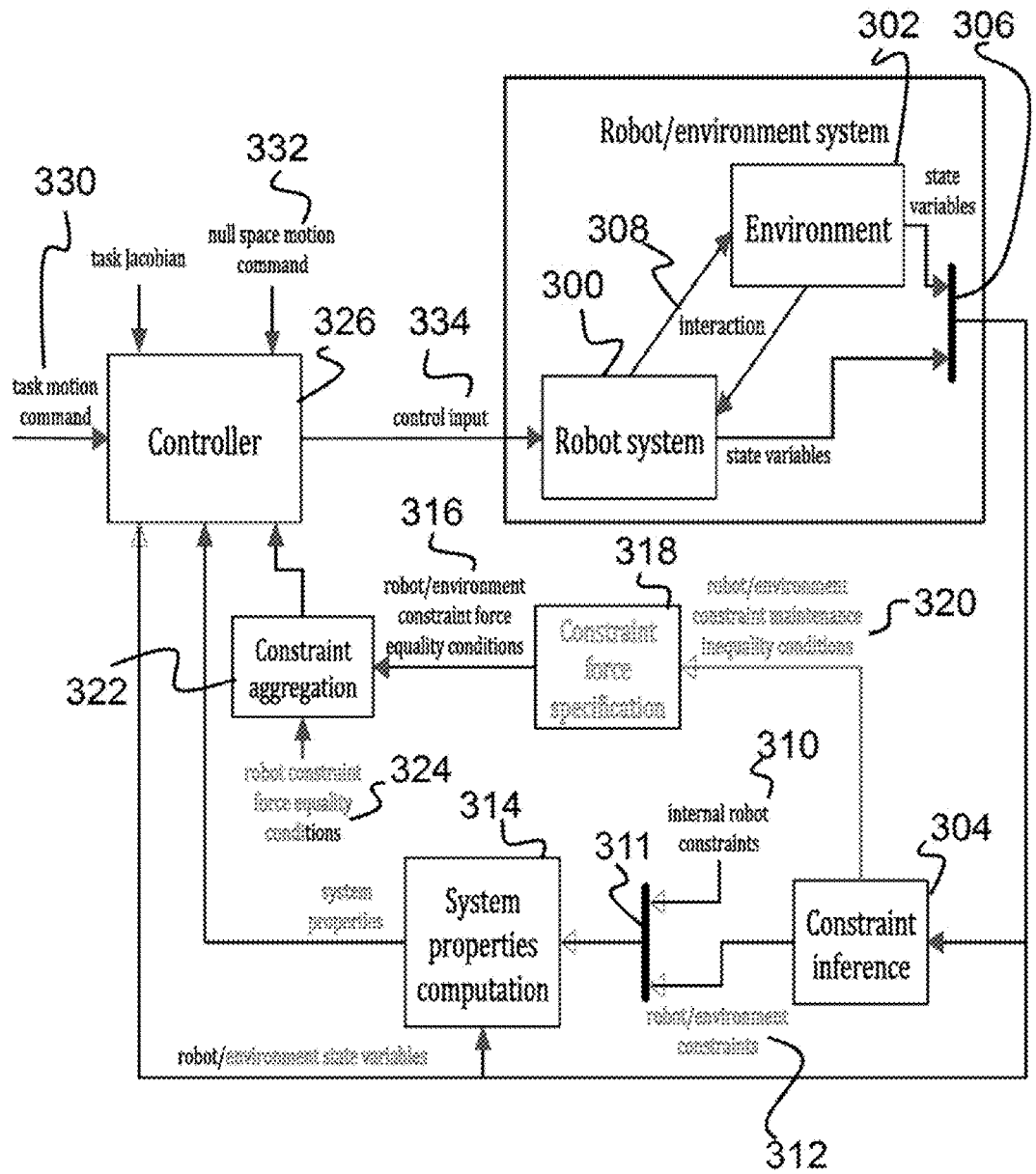
FIG. 3 is a flow chart illustrating system-level architecture for task-level constrained motion and force control according to the principles of the present invention.

The system described herein provides a solution for robot motion and force control in environments with constraints. A constraint is any condition between the robot and itself, or between the robot and the external environment (including other robots) that can be expressed as algebraic relations (holonomic constraints). A unique aspect and as illustrated in FIG. 3 is that the system provides a novel control design and implementation, whereby motion control is formulated, consistent with the specified constraints, that simultaneously allows for the control of the constraint forces in a desired manner without the need for force sensing or servoing. An underlying capability for the controller is achieved through a decomposition of the overall robot dynamics into three complementary subspaces: task space, posture space, and constraint space, allowing for a natural and intuitive way of representing desired task motion, secondary postural motion, and constraint forces. The system can be implemented in a variety of automated or robotic manipulation systems, including but not limited to assembly line robots, satellite servicing robots, etc. The system is described in further detail below.

(3) Specific Details of the Invention

The system is designed to provide a unified constraint-based control implementation to facilitate high degree-of-freedom robots operating in complex environments. Holonomic constraints arise due to robot interaction with the environment as well as to the internal structure of the robotic system. The system is generally based on a task-level constrained motion and force control framework, described by De Sapio, V., Khatib, O., and Delp, S., in "Task-level approaches for the control of constrained multibody systems," Multibody System Dynamics, 16(1), 73-102 (2006), which is hereby incorporated by reference as through fully set forth herein. The system provides an extension of task-level (or operational space) control. An example of traditional task-level control was described by Khatib, O. in "A unified approach for motion and force control of robot manipulators: The operational space formulation," Robotics and Automation, IEEE Journal of, 3(1), 43-53 (1987), which is hereby incorporated by reference as through fully set forth herein. In task-level control of the prior art, motion is decomposed into a task space and a complementary posture space. Control is performed within these spaces rather than configuration or joint space. The system according to the principles of the present invention introduces an additional constraint space that describes the motion of the system subject to imposed holonomic constraints. A high-level description of the system architecture is provided in FIG. 3. Given a robot system 300 interacting with the environment 302, at each time step, constraints are inferred 304 from the sensed state 306 of the robot/environment interaction 308. Non-limiting examples of inferred constraints include intermittent contact between the robot and the environment arising from interaction. Examples include the end effector of the robot grasping or pushing against an object in the environment. The inferred constraints 304 are appended 311 to the known internal mechanism constraints (e.g., constraints between joints and linkages) of the robot (internal robot constraints 310). This is accomplished by concatenating the vector of inferred constraints with the vector of internal mechanism constraints. Thereafter, the various properties 600 (i.e., task space parameters) associated with the constrained dynamics of the robot/environment system (i.e., robot/environment constraints 312) are computed 314 on a digital computer using the equations defined herein and sent to the controller. Task space parameters were described by De Sapio, V., and Park, J. in "Multitask constrained motion control using a mass-weighted orthogonal decomposition," Journal of Applied Mechanics, 77(4), 041004 (2010) and De Sapio, V. in "Task-level control of motion and constraint forces in holonomically constrained robotic systems," In Proceedings of the 18th World Congress of the International Federation of Automatic Control (2011), which are both incorporated by reference as though fully set forth herein.

A set of equality conditions 316 on the constraint forces are specified 318 based on the constraint maintenance inequality conditions 320 associated with maintaining desired robot/environment interactions (e.g. holding onto an object, releasing an object, maintaining contact with surfaces). Equality conditions are represented as standard mathematical equalities, e.g. a=b, and inequality conditions are represented as standard mathematical inequalities, e.g. a>b). These conditions are aggregated via vectorial concatenation (i.e., constraint aggregation 322) with any control conditions on the internal mechanism constraints 324 of the robot and sent to the controller 326. The resulting aggregate conditions 328 on the constraint forces, along with the specified task 330 and null space motion 332 commands are used to compute the control input (joint torques) 334 to the robot 300.

The technical approach, which makes this system implementation architecture possible, is summarized below. In joint space control the dynamics of a mechanical system are, $\tau = M(q)\ddot{q} + b(q,\dot{q}) + g(q)$, where q is the vector of joint coordinates, $\tau$, is the vector of applied joint torques, M(q), is the joint space mass matrix, $b(q,\dot{q})$, is the vector of centrifugal and Coriolis forces, and g(q) is the vector of gravity forces.

Figures 4A, 4B:
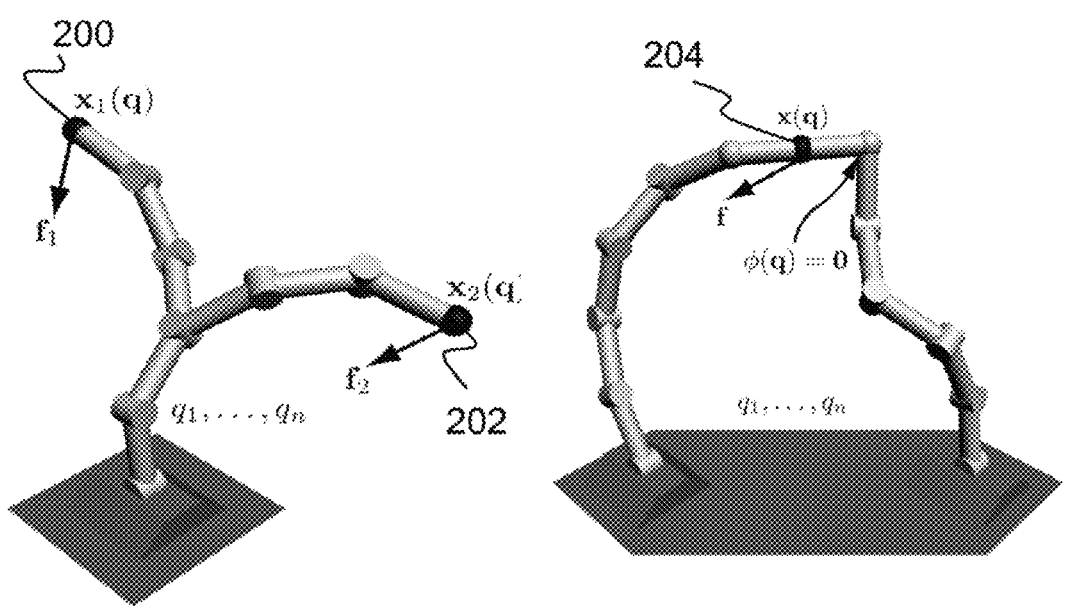
FIG. 4A is an illustration depicting a branching chain system.
FIG. 4B is an illustration depicting a system with holonomic constraints in the form of loop constraints.

In task space (an example of which is shown in FIG. 4A) these dynamics are mapped into the following form, $f = \Lambda(q)\ddot{x} + \mu(q,\dot{q}) + p(q)$, where x is a description of task coordinates that are to be controlled, f, are the control forces that act at the task, and $\Lambda(q)$, $\mu(q,\dot{q})$, and p(q), are the task space mass matrix, centrifugal and Coriolis force vector, and gravity force vector, respectively. The applied joint torques are given by, $\tau = J^T f + N^T \tau_s$, where J is the Jacobian of the task coordinates, $N^T$ is the null space projection matrix, and $\tau_s$, is an arbitrary joint torque filtered through the null space projection matrix.

FIG. 4A, for example, illustrates a branching chain system. The task space vectors describe the Cartesian positions of the two terminal points 200 and 202. The task forces (i.e., $f_1$ and $f_2$) are applied at the task points (e.g., terminal points 200 and 202). Alternatively, FIG. 4B illustrates a system with holonomic constraints in the form of loop constraints. The task space vector in such an example describes the Cartesian position of a point on one of the links 204. The objective is to control the system using task-level commands, in the presence of the mechanism constraints.

For a system constrained by a set of holonomic constraints, $\phi(q)=0$, (an example of which is shown in FIG. 4B), the configuration space dynamics are augmented with Lagrange multipliers, $\lambda$, $\tau = M(q)\ddot{q} + b(q,\dot{q}) + g(q) - \Phi^T \lambda$, where $\Phi^T$ is the constraint Jacobian. The approach expresses these dynamics in terms of task space parameters (see De Sapio et. al., 2010, 2011, for a description of task space parameters), such as those below:

$\Lambda_c(q) = (JM^{-1}\Theta^T J^T)^{-1}$, $\mu_c(q,\dot{q}) = \Lambda_c J M^{-1} \Theta^T b - \Lambda_c (\dot{J} - JM^{-1}\Phi^T H \dot{\Phi})\dot{q}$, $p_c(q) = \Lambda_c J M^{-1} \Theta^T g$, $N_c(q)^T = \Theta^T (1 - J^T \Lambda_c J \Theta M^{-1})$, $\alpha(q,\dot{q}) = H\Phi M^{-1} b - H\dot{\Phi}\dot{q}$, $\rho(q) = H\Phi M^{-1} g$, $H(q) = (\Phi M^{-1} \Phi^T)^{-1}$, $\Theta(q)^T = 1 - \Phi^T \overline{\Phi}^T$, $\overline{\Phi} = M^{-1} \Phi^T H$.

The task space parameters can also be expressed as $\tau = \Theta^T (\Lambda_c \ddot{x} + \mu_c + p_c) + \Phi^T (\alpha + \rho) + U_c^T \tau_N - \Phi^T \lambda$, where $\Theta^T$ is the constraint null space projection matrix, $\Lambda_c$, $\mu_c$, $p_c$, are the task/constraint space mass matrix, centrifugal and Coriolis force vector, and gravity force vector, respectively. The centrifugal and Coriolis forces, and gravity forces projected at the constraints are $\alpha$ and $\rho$ respectively. Finally, $U_c^T$ is the combined null space projection matrix, with respect to both task and constraints, and $\tau_N$ is the control vector for the null space. For control purposes, the holonomic constraints can be expressed as, $\tau + \Phi^T \lambda = \Theta(\hat{\Lambda}_c f^* + \hat{\mu} + \hat{p}_c) + \Phi^T(\hat{\alpha} + \hat{\rho}) + \hat{U}_c^T \tau_N$, where • represents estimates of the dynamic parameters and f* is the control law. A set of implicit conditions on the constraint forces is specified as, $A(q,\dot{q})\lambda = d(q,\dot{q})$.

Figure 5:
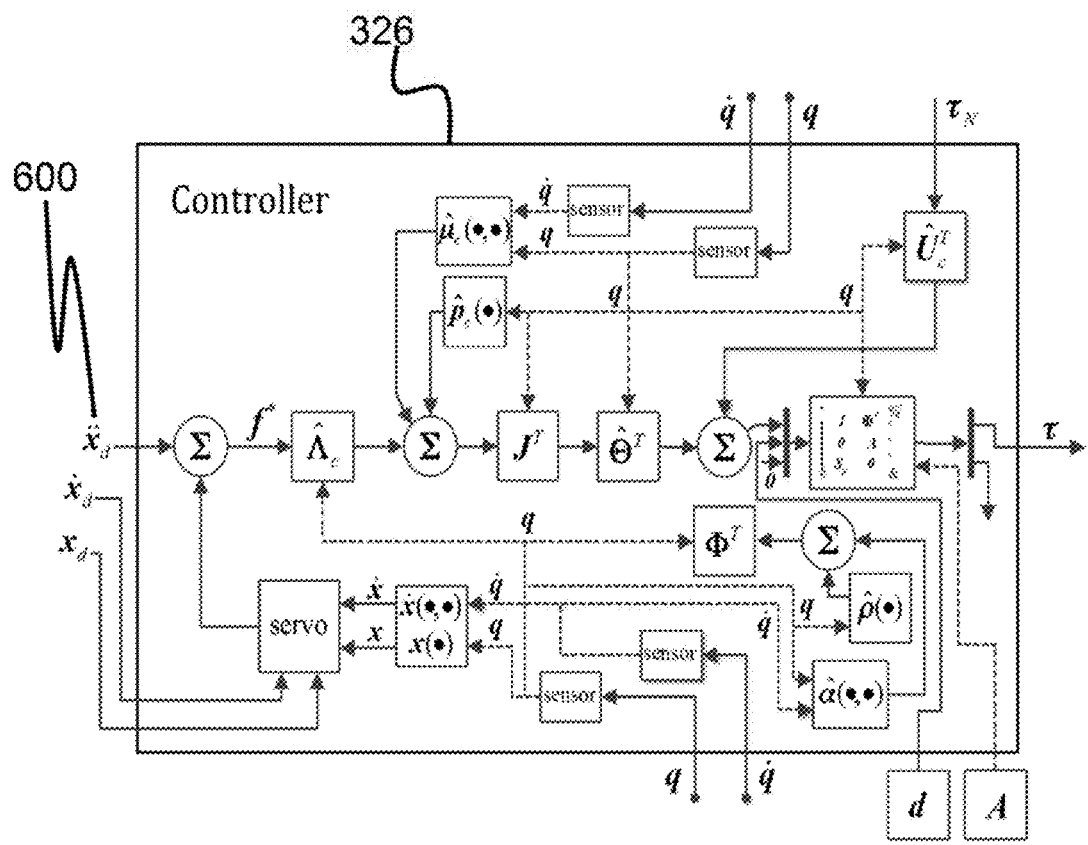
FIG. 5 is an illustration depicting a task-level tracking controller for a constrained system according to the principles of the present invention.

To accommodate passive joints, the actuator constraint conditions are expressed as, $S_p \tau = 0$, where $S_p$ is the selection matrix for the passive joints. This controller (depicted as element 326 in FIG. 3) is depicted in FIG. 5. These equations can be represented as linear system that can be solved as, $$\begin{pmatrix} \tau \\ \lambda \end{pmatrix} = \begin{pmatrix} 1 & \Phi^T \\ 0 & A \\ S_p & 0 \end{pmatrix}^{-1} \begin{pmatrix} \Theta(\hat{\Lambda}_c f^* + \hat{\mu}_c + \hat{p}_c) + \Phi^T(\hat{\alpha} + \hat{\rho}) + \hat{U}_c^T \tau_N \\ d \\ 0 \end{pmatrix}.$$

Using this solution, a general-purpose controller (as shown in FIG. 5) 326 can be generated for accommodating task-level constrained motion and force control. The desired task motion and null space motion are tracked using appropriate dynamic compensation that accounts for the constraints. Simultaneously, conditions on the constraint forces are satisfied by the generated torques. Inputs to the controller 326 include the desired goal-oriented motion commands for the robot. For example, the task space parameters 600 include the command inputs on the left of the block diagram as well as the estimates of the task space parameters $\Lambda_c$, $\mu_c$, $p_c$. While internal to the block diagram, they are system parameters that must be computed according to the process described herein. These measurements and estimates of the system properties (i.e., system parameters 600) are used to compute a control output for the robot. In essence, FIG. 5 is a block diagram depiction of the linear system representation provided above.

Figure 6:
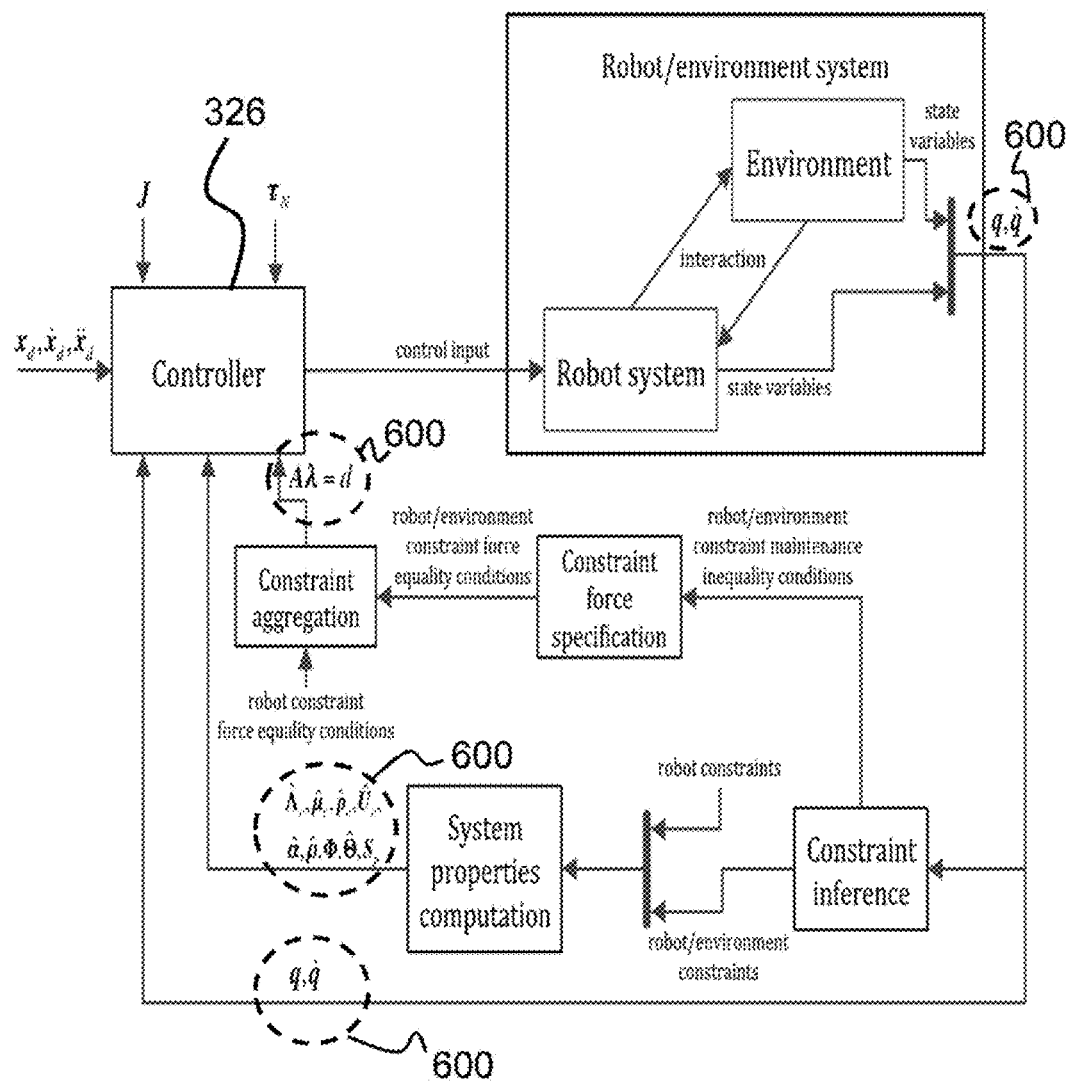
FIG. 6 is an illustration depicting a system-level implementation for task-level constrained motion and force control according to the principles of the present invention, showing the system parameters generated by each block.

Given this controller 326 architecture, the system architecture of FIG. 3 can be expressed in more detail, as depicted in FIG. 6. In this case, the system-level implementation for task-level constrained motion and force control shows the specific system parameters 600 generated by each block.

Figure 7A:
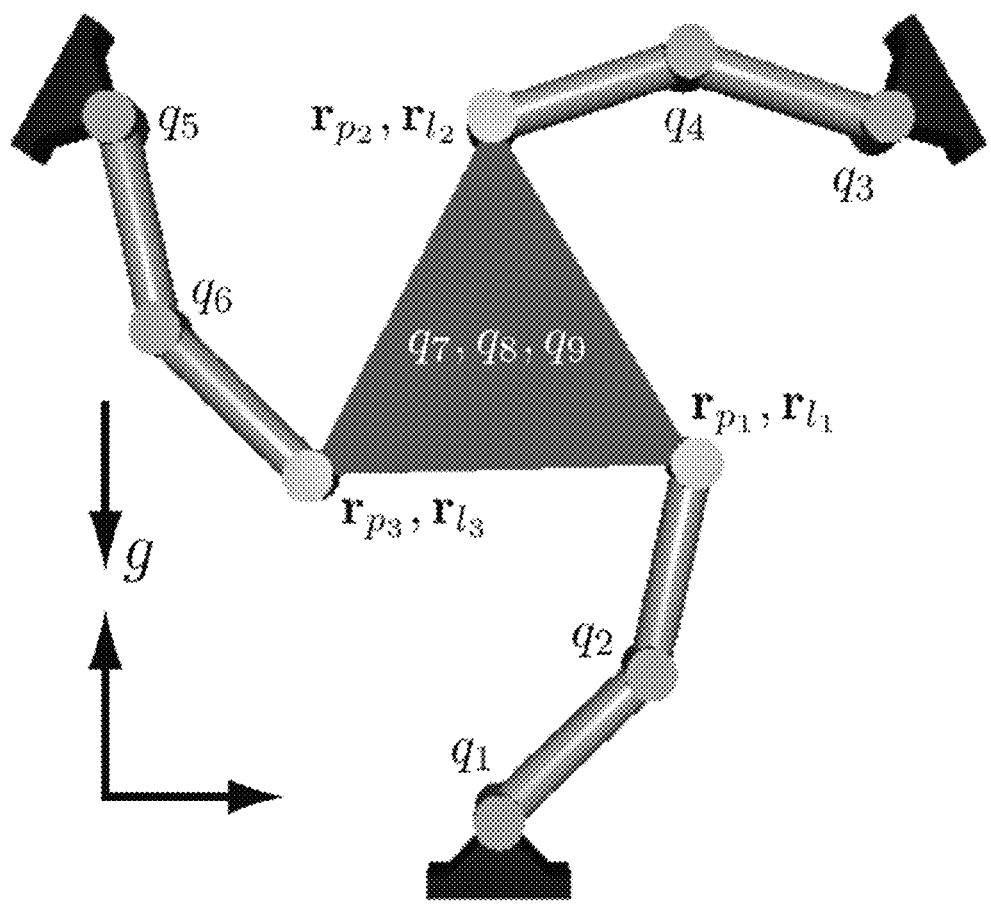
FIG. 7A is an illustration of a parallel mechanism consisting of serial chains with loop closures.
Figure 7B:
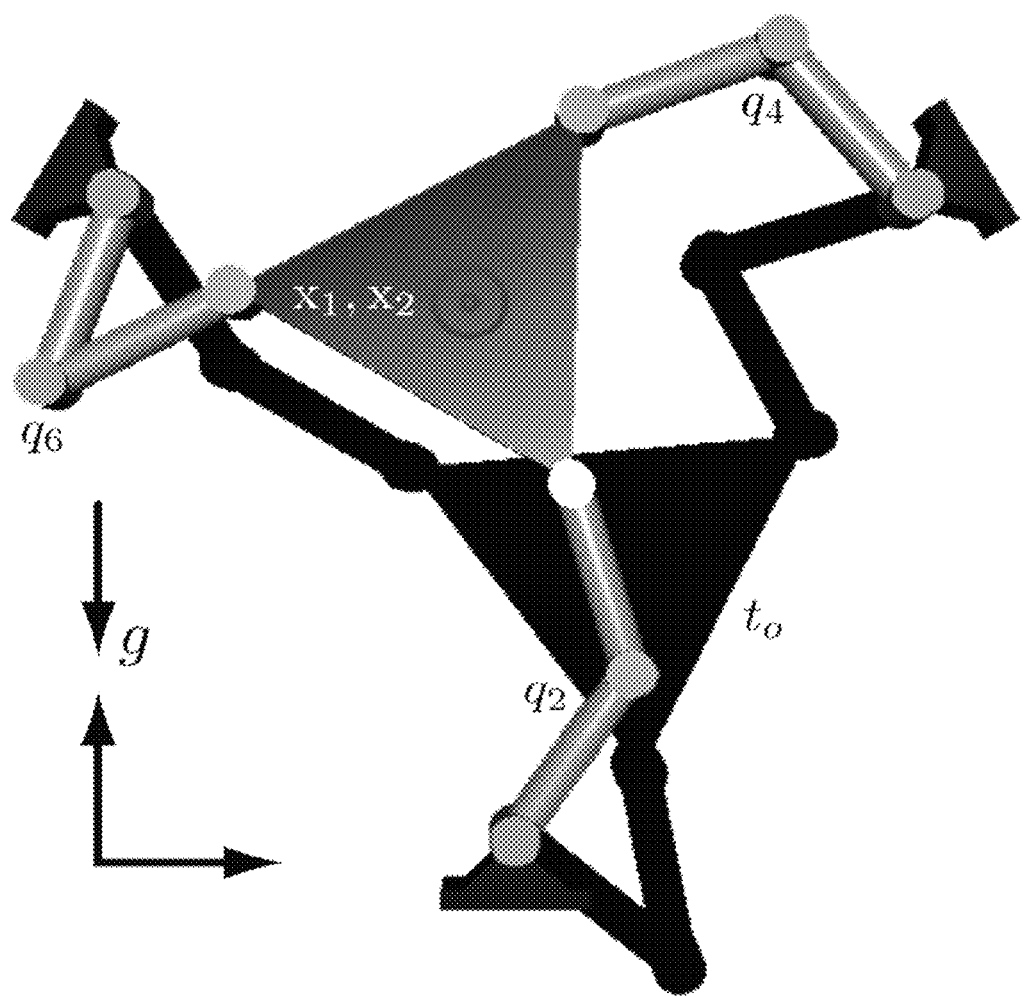
FIG. 7B is an illustration of the mechanism depicted in FIG. 7A, showing two base joints and three elbow joints being actuated to command the platform to move to a target while its orientation is uncontrolled and constraint forces at an interface are specified.

The controller has been validated in a simulation for a robot with persistent internal constraints, as shown in FIGS. 7A through 7B. For example, FIG. 7A depicts a parallel mechanism consisting of serial chains with loop closures. Two base joints, $q_1$ and $q_3$ as well as the elbow joints, $q_2$, $q_4$, and $q_6$, are actuated while the remaining joints are passive. As shown in FIG. 7B, the position of the platform is commanded to move to a target while its orientation is uncontrolled and the constraint forces at the interface of $r_{p1}$ and $r_{l1}$ are specified.

Figure 8A:
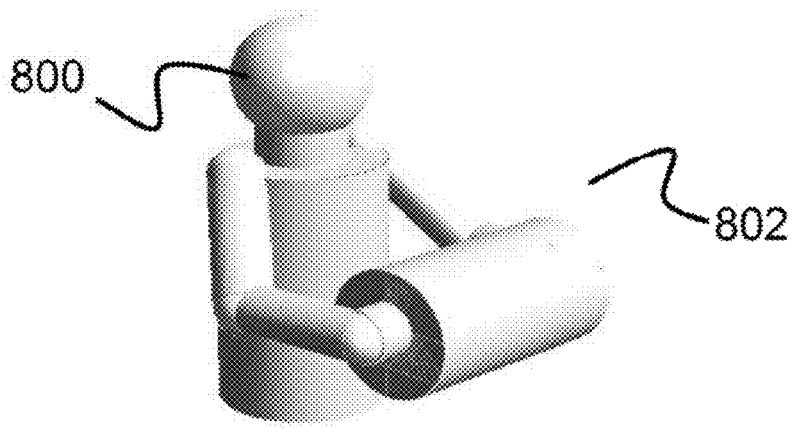
FIG. 8A is an illustration depicting a humanoid robot lifting an object.
Figure 8B:
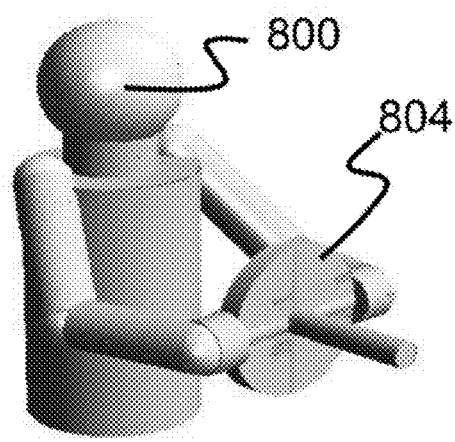
FIG. 8B is an illustration depicting a humanoid robot as turning a steering wheel.
Figure 8C:
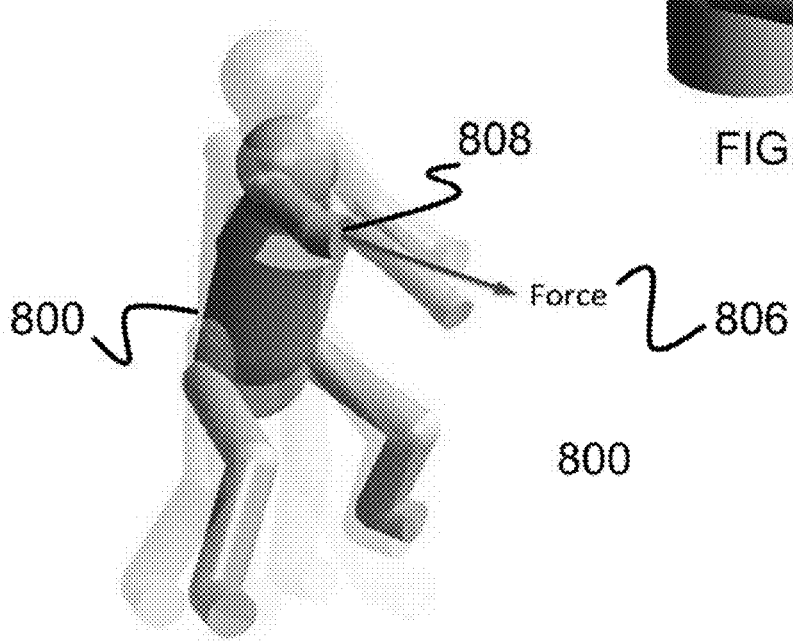
FIG. 8C is an illustration depicting a humanoid robot as exerting a force with a hand.

For further validation, the controller of FIG. 5 was implemented and validated in a simulation for a humanoid robot interacting with the environment (as shown in the simulations depicted in FIGS. 8A through 8C). For example, the controller was simulated with a humanoid robot 800 for lifting an object 802 (as shown in FIG. 8A), turning a value (such as using hands to turn a steering wheel 804 as depicted in FIG. 8B), and exerting a force 806 with a hand 808 (as shown in FIG. 8C). In the simulation for exerting a force (e.g., with a power tool), the system herein allows computation of the optimal feet placement to allow the robot 800 to exert a higher force. Thus, as can be appreciated, the system described herein can be implemented with or otherwise incorporated into any robotic system.

What is claimed is:

1. A system for controlling motion and constraint forces in a robotic system, the system comprising:
    one or more processors and a memory, the memory having executable instructions encoded thereon, such that upon execution of the instructions, the one or more processors perform operations of:
        inferring constraints from a sensed state of robot/environment interactions;
        appending the inferred constraints to known internal robot constraints to generate constrained dynamics;
        determining properties associated with the constrained dynamics and providing the properties to a controller;
        determining inequality conditions associated with maintaining desired robot/environment interactions;
        specifying a set of equality conditions based on the inequality conditions;
        aggregating the set of equality conditions with any internal robot constraints to generate aggregated conditions that are provided to the controller;
        generating joint torque commands for the robot based on the aggregated conditions and a specified task and null space motion command; and
        actuating the robot based on the joint torque commands.

2. A system for controlling motion and constraint forces in a robotic system, the system comprising:
    at least one torque controlled robot having constraints and one or more joints;
    one or more processors and a memory, the memory having executable instructions encoded thereon, such that upon execution of the instructions, the one or more processors perform operations of:
        inferring constraints from a sensed state of the robot/environment interactions;
        appending the inferred constraints to known internal robot constraints to generate constrained dynamics;
        determining properties associated with the constrained dynamics and providing the properties to a controller;
        determining inequality conditions associated with maintaining desired robot/environment interactions;
        specifying a set of equality conditions based on the inequality conditions;
        aggregating the set of equality conditions with any internal robot constraints to generate aggregated conditions that are provided to the controller;
        generating joint torque commands for the robot based on the aggregated conditions and a specified task and null space motion command; and
        actuating the robot based on the joint torque commands.

3. A method for controlling motion and constraint forces in a robotic system, the method comprising an act of:
    causing one or more processors to execute instructions encoded upon a memory, such that upon execution of the instructions, the one or more processors perform operations of:
        inferring constraints from a sensed state of robot/environment interactions;
        appending the inferred constraints to known internal robot constraints to generate constrained dynamics;
        determining properties associated with the constrained dynamics and providing the properties to a controller;
        determining inequality conditions associated with maintaining desired robot/environment interactions;
        specifying a set of equality conditions based on the inequality conditions;
        aggregating the set of equality conditions with any internal robot constraints to generate aggregated conditions that are provided to the controller;
        generating joint torque commands for the robot based on the aggregated conditions and a specified task and null space motion command; and
        actuating the robot based on the joint torque commands.

4. A computer program product for controlling motion and constraint forces in a robotic system, the computer program product comprising:
    computer-readable instructions stored on a non-transitory computer-readable medium that are executable by a computer having one or more processors, such that upon execution of the instructions, the one or more processors perform operations of:
        inferring constraints from a sensed state of robot/environment interactions;
        appending the inferred constraints to known internal robot constraints to generate constrained dynamics;
        determining properties associated with the constrained dynamics and providing the properties to a controller;
        determining inequality conditions associated with maintaining desired robot/environment interactions;
        specifying a set of equality conditions based on the inequality conditions;
        aggregating the set of equality conditions with any internal robot constraints to generate aggregated conditions that are provided to the controller;

generating joint torque commands for the robot based on the aggregated conditions and a specified task and null space motion command; and actuating the robot based on the joint torque commands.

* * * * *